UNITED STATES PATENT OFFICE 2,212,152

FLAMEPROOF COMPOSITION

Martin Eli Cupery, Wilmington, Del., assignor to E. I. du Pont de Nemours & Company, Wilmington, Del., a corporation of Delaware No Drawing. Application February 21, 1939, Serial No. 257,760

9 Claims. (Cl. 91—68)

This invention relates to the flameproofing of organic combustible materials, particularly textile and cellulosic materials.

This invention has as an object the provision of a novel and useful fire-retardant for combustible organic materials. A further object is the provision of a fire-retardant for textiles and cellulosic materials. A still further object is the provision of a combined softening and fire-retarding agent for textiles. Other objects will appear hereinafter.

These objects are accomplished by the following invention which comprises non-volatile combustible organic, and particularly cellulosic, materials containing, in amount sufficient to act as a fire-retardant, a fusion product of urea and sulfamic acid.

The invention in its preferred form is practiced as follows. The fire-retardant is first prepared by heating one mol of sulfamic acid with from 1.25 to 3.0 mols of urea to a temperature at which reaction takes place as evidenced by the evolution of heat which temperature is ordinarily at least some 15° C. above the point at which the mixture fuses, and preferably higher, then cooling externally to dissipate the heat of reaction. The minimum temperature will usually be about 120° C. The reaction is generally complete within one hour. The product is then dissolved in water, any undissolved material filtered off, and the solution, if acidic, neutralized with ammonia or alkali. This neutral aqueous solution is then applied directly to the combustible material. The amount which can be absorbed will naturally depend on the nature of the material. If relatively dense, the aqueous solution should preferably be concentrated, while if porous, more dilute solutions are suitable. The regulation of the concentration of the solution is a convenient means of controlling the amount of fire-retardant applied. The amount to apply will of course depend upon the degree of flame-resistance desired. Cotton fabrics, paper, and regenerated cellulose film are rendered entirely flameproof by application thereto of 10–18% by weight of the fire-retardant. To attain this result, solutions of about 5–10% are generally used.

The nature of the reaction or reactions taking place in making the fire-retardant are not known, but it is believed that a complex mixture of products is formed. Titration of the dissolved fusion product indicates that the sulfamic acid is neutralized and that a more extensive reaction than mere formation of urea sulfamate takes place.

The more detailed practice of the invention is illustrated by the following examples, wherein parts given are by weight. There are of course many forms of the invention other than these specific embodiments.

Example I

One hundred fifty (150) parts of urea heated to about 120° C., is mixed with 30 parts of powdered sulfamic acid. The mixture readily fuses to a clear melt at about 110° C. An additional 164 parts of sulfamic acid is next added with stirring while the fused mixture is maintained at 110 to 115° C. Upon further heating to 120° C. an exothermic reaction begins, and a considerable amount of gas is evolved. Cooling is required to keep the temperature below 150° C. After standing at 140–150° C. for ten minutes, the mixture is cooled and then treated with 300 parts of ice water. A small amount of product remains undissolved and is separated by filtration. After neutralizing the filtered solution with concentrated ammonium hydroxide, it is diluted with water to a 5% solution. Regenerated cellulose sheeting in the gel form is immersed for one minute in this solution, and is then removed and dried under slight tension at 100° C. for 10 minutes. The dried cellulose sheet, which contains about 15% of the fire-retardant, is entirely transparent and shows no crystallization of fire-retardant even upon storage at 25° C. and 50% relative humidity for several months. The treated sheet is flameproof to the extent that it ignites only at the point of contact with a flame while showing no tendency to propagate a flame. At a relative humidity above 50%, the fire-retardant also has a very definite softening action on the regenerated cellulose sheet.

Example II

Ninety (90) parts of urea is heated to 140° C. and sulfamic acid slowly added to the melt with stirring until 97 parts of the acid has been added. The mass forms a clear melt which foams slightly with some evolution of ammonia. After maintaining a temperature of 145° C. for ten minutes after the addition of the acid, the mass is cooled and dissolved in enough water to give 1000 parts of solution. Titration of a sample of the solution using phenolphthalein as indicator shows that about 80% of the sulfamic acid is neutralized by the fusion reaction with urea. After neutralizing with ammonia, the solution is diluted with water to give 15% concentration of fire-retardant. Cotton broadcloth is rendered flameproof when impregnated with 10–13% by weight of the fire-retardant, based on the original weight of cloth. The treated fabric shows no increased harshness or stiffness on drying and no objectionable crystallization or surface efflorescence upon storage.

Equally good results are obtained upon treating other fabrics, such as cotton voile, muslin, linen and viscose rayon fabrics as in Example II. Similarly, various types of paper such as hand towel paper, tissue sheet, crepe paper, wrapping paper, and the like are made flameproof by impregnating with 10 to 15% by weight of the above fire-retardant.

*Example III*

One hundred eighty (180) parts of urea is fused with 97 parts of sulfamic acid by gradually heating the mixture to 160° C. and maintaining the latter temperature for fifteen minutes. Ammonia is slowly evolved from the melt. The melt is then poured into 1850 parts of cold water. The small residue which remains undissolved is removed by filtration and the filtrate neutralized with ammonia. The resulting solution contains about 13% of fire-retardant. Cotton voile impregnated with this solution absorbs about 10–13% of the fire-retardant and is made flameproof in the sense that it will not propagate a flame when ignited but will only be charred at the point of actual contact with the flame.

Various fabrics such as muslin, linen, viscose rayon and the like, as well as paper and transparent regenerated cellulose sheet, can be made flameproof when treated with the product of Example III in the manner described.

The examples given describe fusions of urea with sulfamic acid as follows:

| Example | Parts | | Mol ratio | | Temperature | Time heated at maximum temperature |
|---|---|---|---|---|---|---|
| | Urea | Acid | Urea | Acid | | |
| | | | | | °C. | Minutes |
| 1 | 150 | 194 | 1.25 | 1 | 110–150 | 10 |
| 2 | 90 | 97 | 1.5 | 1 | 140–145 | 10 |
| 3 | 180 | 97 | 3.0 | 1 | 115–160 | 15 |

These proportions, i. e., 1.25 to 3 mols urea per mol of acid, are preferred although mol ratios as low as 1:1 or as high as 5:1 (urea:acid) may be used. Proportions of urea below 1.25 mols give difficult fusions and yield excessive biuret as by-product and will not generally be used. As the amount of urea exceeds about 3 mols, the resultant fusion products become less and less effective as fire-retardants, and when it exceeds about 5 mols, they are no longer very practical. This latter is especially evident with sheet gel regenerated cellulose.

The reaction which takes place is exothermic and adequate provision must be made to prevent the temperature from exceeding about 160° C. as higher temperatures cause excessive formation of biuret. On the other hand, the mixture must be heated sufficiently to start the reaction between urea and sulfamic acid. A temperature of about 120° C. will in general be suitable for starting the reaction. When high proportions of urea are employed, e. g. 3 mols urea to one mol acid, the minimum temperature for starting the reaction and the maximum temperature at which the reaction is carried out may be somewhat higher than corresponding temperatures when low proportions of urea to acid, e. g. 1.25 mols urea to one mol acid, are used.

Because the reaction proceeds rapidly, a period of only 10 to 15 minutes is required to cause it to proceed to approximately 80% completion, as is indicated by the neutralization of the sulfamic acid. It is not practical to carry the reaction further for a longer period of time as excessive formation of biuret will take place as the reaction time is increased. However, if the maximum reaction temperature is lowered, the time of reaction may be increased proportionately but the results, with respect to the formation of by-product biuret, will be very similar.

The procedure for dissolving the product and diluting the solution to proper concentration is easily carried out by anyone skilled in the art. Likewise simple experimentation will readily indicate the concentration of solution which is optimum for impregnating a given material and the proper retention of fire-retardant which is required in order to produce the desired degree of fire and flame resistance.

The present urea-sulfamic acid fusion products may be used in combination with known fire-retardants such as ammonium sulfate, ammonium chloride, ammonium bromide, ammonium fluoride, ammonium carbonate, ammonium phosphate, boric acid, sodium borate, sodium silicate, sodium carbonate, and the like. Fire-retarding effects may also be obtained when the fusion product is applied by methods other than impregnation from aqueous solution. For example, powdered crystals may be dusted upon a damp surface or surface treated with adhesive; the fusion product may be applied from solution or suspension in an organic liquid; or in the case of a combustible liquid, the fusion product may be incorporated by mixing or milling.

An outstanding advantage of the present sulfamic acid-urea fusion products over the more commonly used prior art flameproofing agents for textile fabrics is that they do not cause the harshness which normally characterizes fabrics treated with the prior art materials, and in many instances they have a softening effect of their own. As flameproofing agents for regenerated cellulose film, the fusion products have an advantage over prior art materials in that, even when present in the film in amounts up to about 18%, they do not crystallize out on the surface of the film under ordinary atmospheric conditions (24° C. and 35% relative humidity) as is characteristic of prior art flameproofing materials. Under favorable conditions, the amount may be as high as 25% without crystallizing out. Furthermore, the present fusion products not only render cellulose and its manufactures (film, thread, fabrics, caps, bands, sponges, etc.), flameproof, but also impart to these materials a certain degree of softness. Hence they may also be used, either alone or in conjunction with glycerol or other common softener, as combined softening and flameproofing agents. In the case of rayon, the fusion product may be added with good results to the viscose, to the undried sheet, or to the dried sheet before or after application of moistureproofing lacquers, such as those of Charch and Prindle (U. S. 1,737,-187 and 1,826,696). The fact that the moistureproofing lacquer may contain highly inflammable substances does not seem to make any appreciable difference. The cellulose thread, fabric, or film which has been impregnated with the fusion product may be stored for prolonged periods without deterioration.

The sulfamic acid-urea fusion products may also be employed as fire-retardants for other cellulosic materials, which term is intended to include cellulose derivatives as well as cellulose, and manufactures of both. Examples of such additional cellulosic materials are cellulose esters such as the nitrate, acetate, propionate, butyrate, and phthalate, and cellulose ethers such as methyl-, ethyl-, benzyl-, crotyl-, hydroxyethyl- and carboxymethylcelluloses. These cellulose derivatives may be undegraded or highly degraded, of any degree of substitution, and of any degree of water-sensitivity.

Fabrics that have been treated with the fusion product and thus rendered fire-resistant may be subsequently rubberized and the rubber coating vulcanized under the usual conditions (about 2 to 3 hours at about 120° C.) without appreciable tendering of the fabric.

The sulfamic acid-urea fusion products are effective as fire-retardants, so far as is known, for any non-volatile combustible organic material whatever. Cellulosic materials, with which the advantages of this invention are most apparent, have been discussed in detail. Other materials are proteins and their manufactures such as films and filaments from casein, gelatin, zein, gliadin, edestin and the like; natural and synthetic resins such as rosin, ester gum, alkyd resins, polymeric esters of acrylic and methacrylic acid, vinyl resins, ether resins, and films and plastics made therefrom; natural and synthetic oils and films therefrom, such as linseed oil, linoxyn, and divinylacetylene polymer; rubber and synthetic rubbers; leather, silk, and wool; and any combustible substance whatever.

The concentration of fire-retardant employed may vary depending upon the type and nature of material to be treated and the degree of flameproofness which is desired. In general, a retention of 8 to 15% by weight of fire-retardant is adequate to flameproof cellulosic materials so that they will not propagate a flame.

The expression "regenerated cellulose in gel form" used in the examples has reference to a sheet of cellulose which has been regenerated in a well-known manner from a solution of cellulose xanthate (viscose), washed and purified, but not dried. Regenerated cellulose in gel form may also be obtained from solutions of suitable cellulose derivatives such as cuprammonium solutions.

The above description and examples are intended to be illustrative only. Any modification of or variation therefrom which conforms to the spirit of the invention is intended to be included within the scope of the claims.

I claim:

1. An article resistant to fire comprising a substantially non-volatile combustible organic material and, as a fire-retardant therefor, the water soluble product obtained by reaction of urea and sulfamic acid in the fused state.

2. An article resistant to fire comprising a cellulosic material and, as a fire-retardant therefor, the water-soluble product obtained by reaction of urea and sulfamic acid in the fused state.

3. Transparent regenerated cellulose sheet material containing, as a fire-retardant therefor, the water soluble product obtained by reaction of urea and sulfamic acid in the fused state.

4. An article resistant to fire comprising a non-volatile combustible organic material and, as a fire-retardant therefor, the water soluble product obtained by the reaction of one to five mols of urea with one mol of sulfamic acid at a temperature of from 120 to 160° C.

5. An article resistant to fire comprising a cellulosic material and, as a fire-retardant therefor, the water soluble product obtained by the reaction of one to five mols of urea with one mol of sulfamic acid at 120 to 160° C.

6. Transparent regenerated cellulose sheet material containing, as a fire-retardant therefor, the water soluble product obtained by the reaction of one to five mols of urea with one mol of sulfamic acid at 120 to 160° C.

7. An article resistant to fire comprising a non-volatile combustible organic material and, as a fire-retardant therefor, the water soluble product obtained by the fusion of five to twelve mols of urea with four mols of sulfamic acid at 120 to 160° C.

8. An article resistant to fire comprising a cellulosic material and, as a fire-retardant therefor, the water soluble product obtained by the fusion of five to twelve mols of urea with four mols of sulfamic acid at 120 to 160° C.

9. Transparent regenerated cellulose sheet material containing, as a fire-retardant therefor, the water soluble product obtained by the fusion of five to twelve mols of urea with four mols of sulfamic acid at 120 to 160° C.

MARTIN ELI CUPERY.